July 8, 1924.  1,500,878

J. F. KRUCHTEN
POWER TRANSMISSION
Filed April 6, 1922    8 Sheets-Sheet 2

Inventor
John F. Kruchten.
by his Attorneys,
Howson & Howson

July 8, 1924.

J. F. KRUCHTEN

POWER TRANSMISSION

Filed April 6, 1922

Inventor.—
John F. Kruchten.
by his Attorneys.—
Howson & Howson

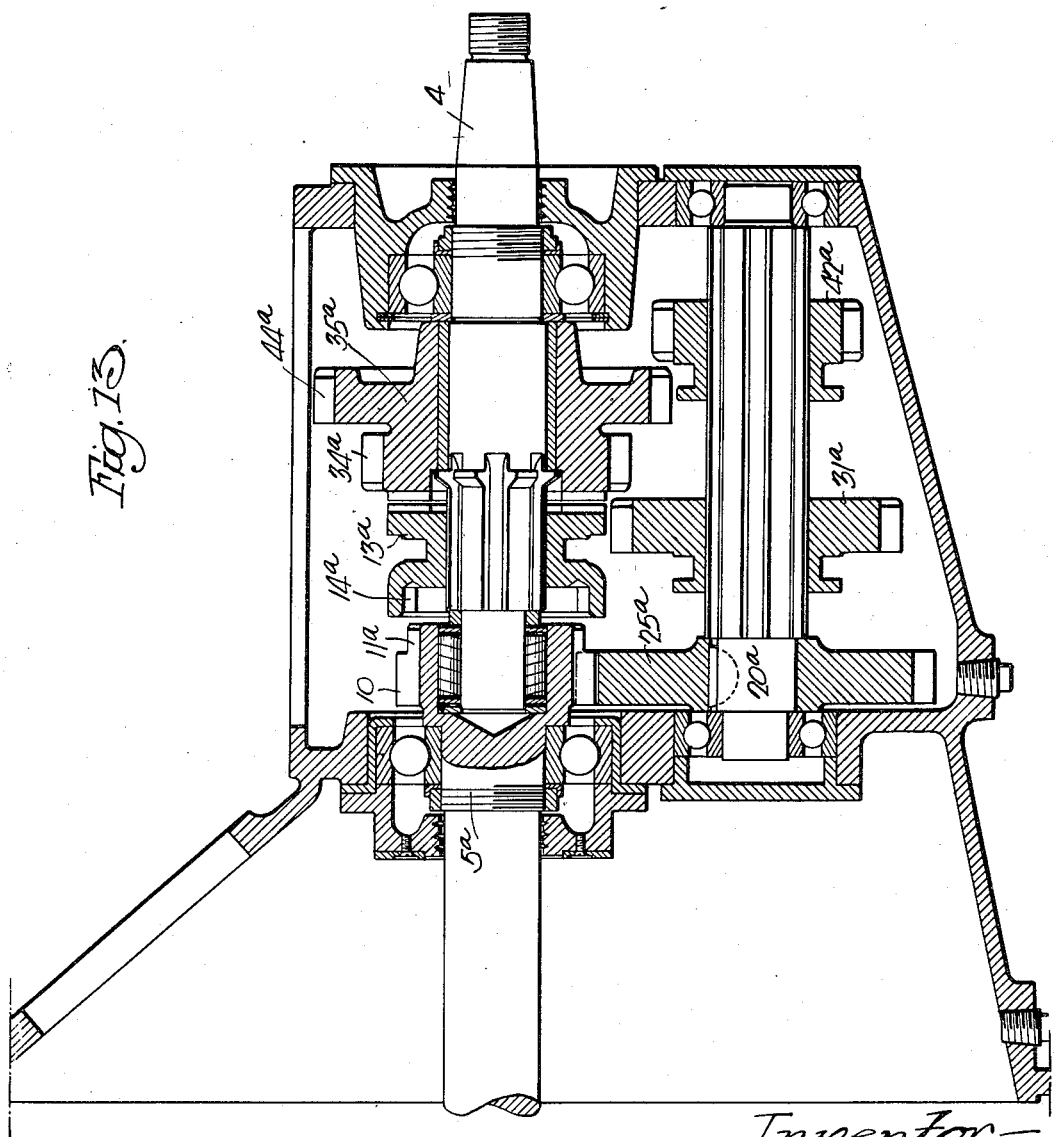

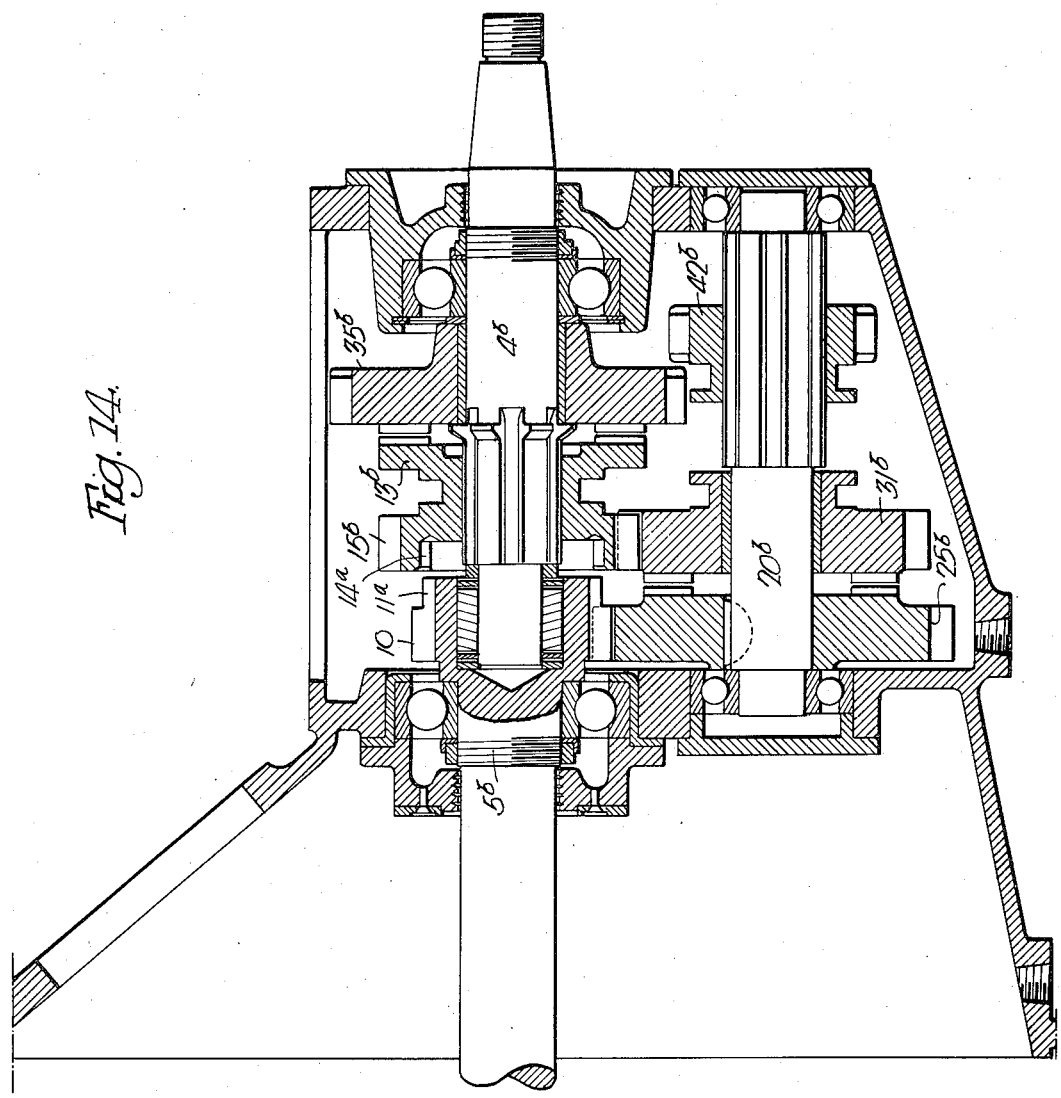

Patented July 8, 1924.

1,500,878

UNITED STATES PATENT OFFICE.

JOHN F. KRUCHTEN, OF PHILADELPHIA, PENNSYLVANIA.

POWER TRANSMISSION.

Application filed April 6, 1922. Serial No. 549,980.

*To all whom it may concern:*

Be it known that I, JOHN F. KRUCHTEN, a citizen of the United States, residing in Philadelphia, Pennsylvania, have invented a Power Transmission, of which the following is a specification.

My invention relates to certain improvements in power transmissions, especially those known as change-speed gears, used in automobiles and located between the engine and the rear axle.

One object of my invention is to construct the power transmission so that cams can be used to shift the several gears and to reverse the movement of the driven shaft.

A further object of the invention is to construct the transmission so that the driven shaft can be directly coupled to the driving shaft and the intermediate gearing can transmit power from the driving shaft to the driven shaft without the intervention of an independent clutch at the driven shaft. A further object of the invention is to design the transmission so that the low speed gearing and the reverse gearing must drive the driven shaft through a clutch operated independently of said gearing, but in time with it.

A still further object of the invention is to construct the cam shaft so that there will be a dwell between each movement in changing the gears, the mechanism being so designed that before a gear can be thrown into mesh with another gear, the driving and driven mechanism is cut out and they cannot be connected until the gears are in full mesh, thus preventing breaking or jamming of the gears due to careless handling of the operating lever.

The invention also relates to improvements in the cam mechanism and shifting arms, which will be described in detail.

In the accompanying drawings:

Figs. 13 and 14 are longitudinal sectional views of modifications of the invention.

Figure 1:
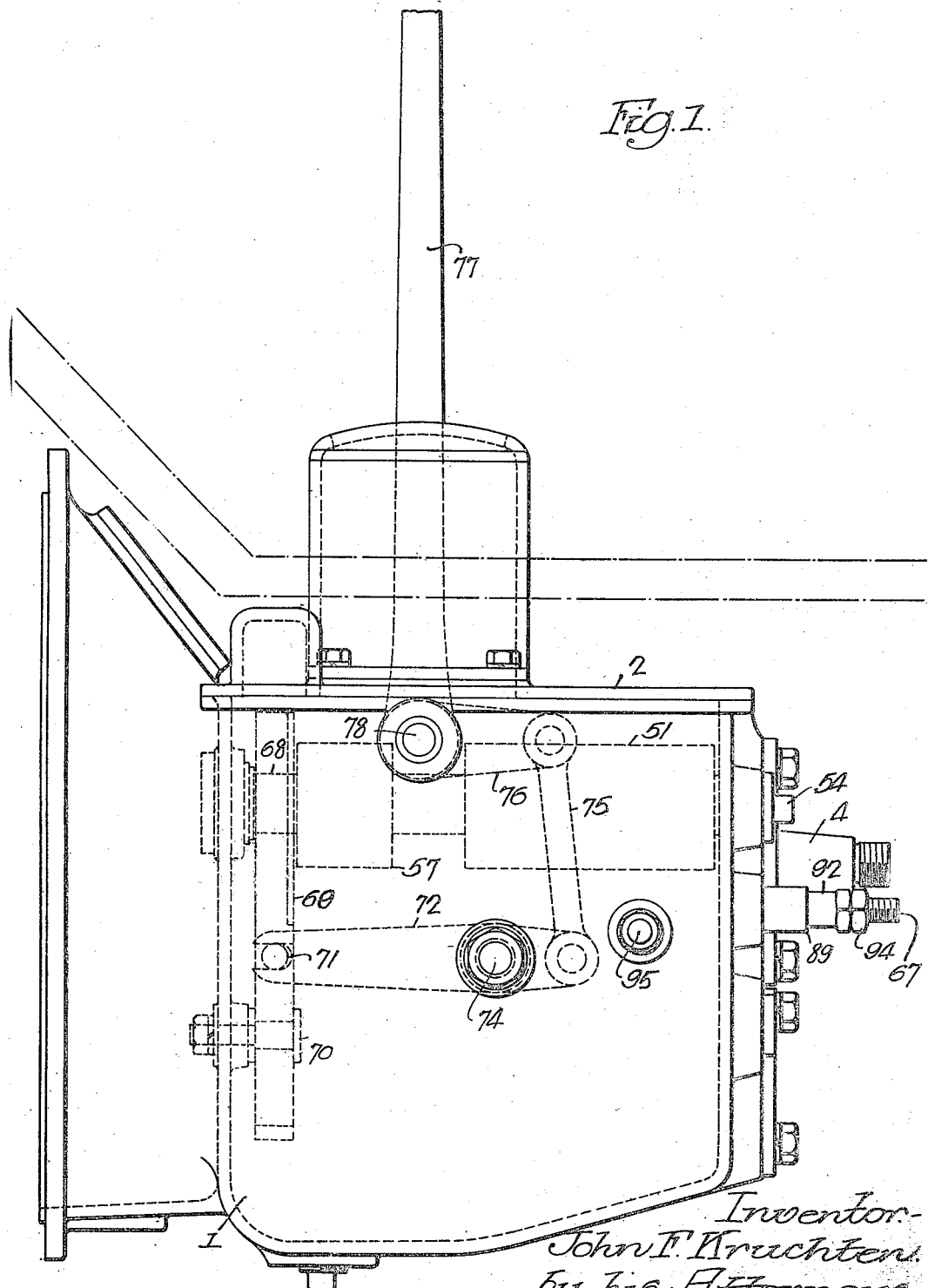
Fig. 1 is a side view of my improved power transmission, the casing being designed to be located on the chassis of an automobile between the engine and the power driven shaft leading to the rear axle.

Referring in the first instance to Figs. 1 to 6 inclusive, 1 is the casing in which the power transmission is located, 2 is the top plate of the casing, 3 is the driving or engine shaft, 4 is the driven shaft, which, when the transmission is mounted in an automobile, is connected to the rear axle. Secured to or forming part of the engine shaft 3 is a hub 5 which is adapted to ball bearings 6 of any of the usual types, as shown clearly in Fig. 4, located in a casing 7 mounted in the front wall of the casing 1.

The driven shaft 4 is reduced at its extreme end 8 and extends into the hub 5 of the engine shaft and is preferably mounted in a roller bearing 9 in said hub. On the periphery of the hub 5 are gear teeth 10 and at the end of the hub opposite to the shaft are internal teeth 11. The driven shaft 4 is splined at 12 and mounted on the splined portion of this shaft is a gear hub 13 having peripheral teeth 14 at the forward end which are arranged to mesh with the internal clutch teeth 11 on the hub 5 when it is wished to drive the driven shaft directly from the engine shaft.

On the opposite end of the gear hub 13 are gear teeth 15 and on the face of this gear hub are clutch teeth 16—the function of which will be described hereinafter.

The driven shaft is mounted in ball bearings 17 in a casing 18 secured to the rear end 19 of the main casing 1. 20 is an intermediate shaft mounted in ball bearings 21 and 22 in the casing 1 and this shaft is splined at 23 and 24. Mounted on the splined portion 23 of the shaft is a gear wheel 25 having teeth 26 which mesh with the teeth 10 on the hub 5. It will be noticed that the teeth 10 are elongated so that when the gear 25 is moved on its shaft, the teeth 26 will remain in mesh with the teeth 10.

27 are internal clutch teeth on the gear 25 arranged to mesh either with the teeth 28 on the hub 29 or with the teeth 30 on a gear wheel 31. The gear wheel 31 has gear teeth 32 in its periphery which mesh with the gear teeth 15 on the gear hub 13 and on the hub 29 beyond the gear 31 are gear teeth 33 which mesh with gear teeth 34 on a hub 35 loosely mounted on the driven shaft 4. This hub 35 has clutch teeth 36 at one end which will be engaged by the teeth 16 of the gear hub 13 when said hub is moved rearwardly on the shaft 4.

The hub 29 is held from moving longitudinally on the shaft 20 by a rib 37 on the shaft which extends into a channel formed by the end of the hub 29 and a ring 38. This ring 38 is held in place on the hub 29 by a second ring 39. The hub 35 is held in place by a rib 40 on the driving shaft 4 and a collar 41 which abuts against the inner race of the ball bearing 17, which, in turn, rests against a threaded collar 42 secured to the shaft 4.

Mounted on the splined portion 24 of the shaft 20 is a gear wheel 42 having gear teeth 43 which mesh with gear teeth 44 of a gear 45 secured by bolts 46 to the hub 35. This particular construction may be modified without departing from the main feature of the invention.

Figure 5:
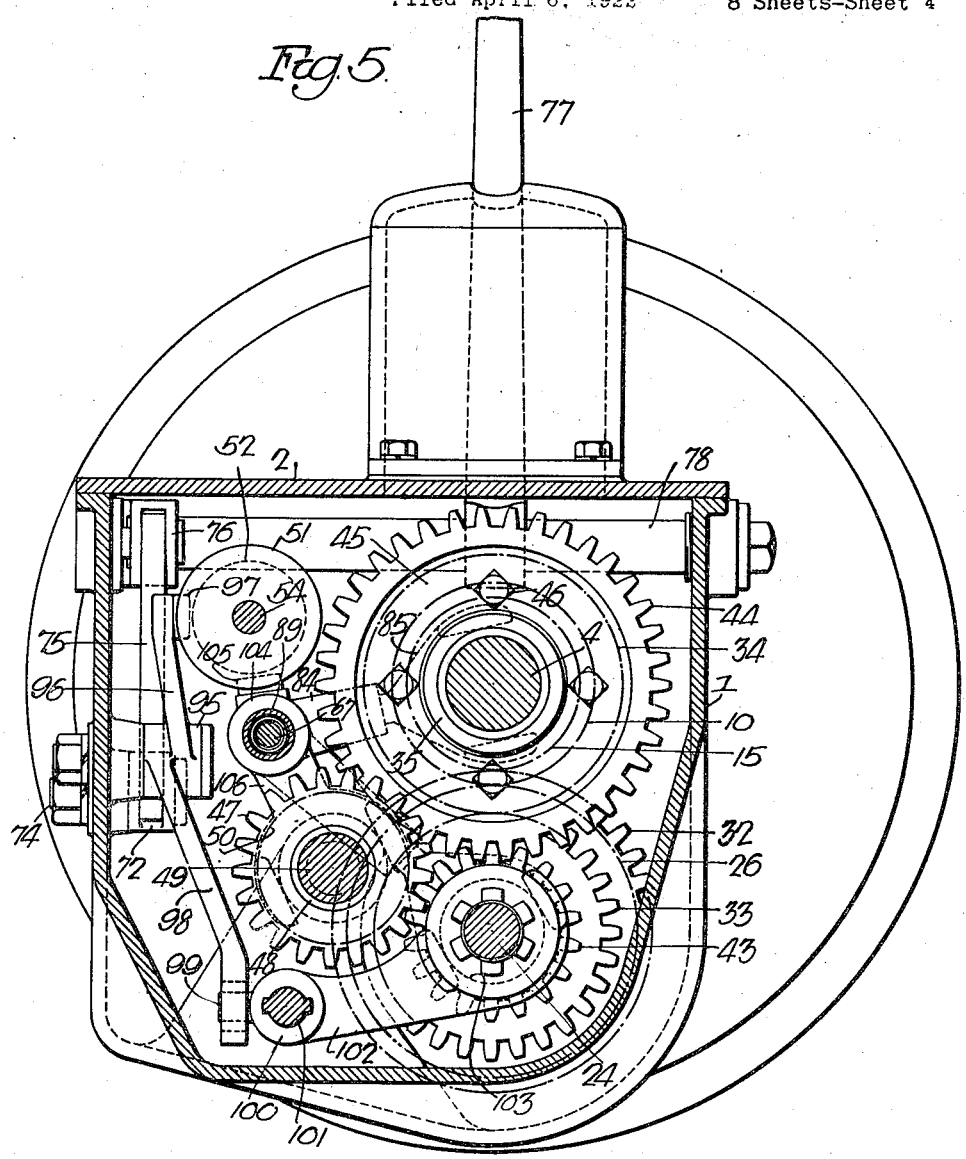
Fig. 5 is a transverse sectional view on the line 5—5, Fig. 2.

An intermediate gear 47 on a hub 48 loosely mounted on a shaft 49, and a second gear 50 on said hub meshing with the gear 42 and the gear 45, Fig. 5, form the reverse gearing. The hub 48 is moved longitudinally on its shaft so that the gears 47 and 50 are normally out of mesh with the other gears and are only brought into mesh when the mechanism is to be reversed.

The gear hub 13, the sliding gear 25, the sliding gear 42 and the reverse hub 48 are controlled by cam mechanism hereinafter described.

Figure 6:
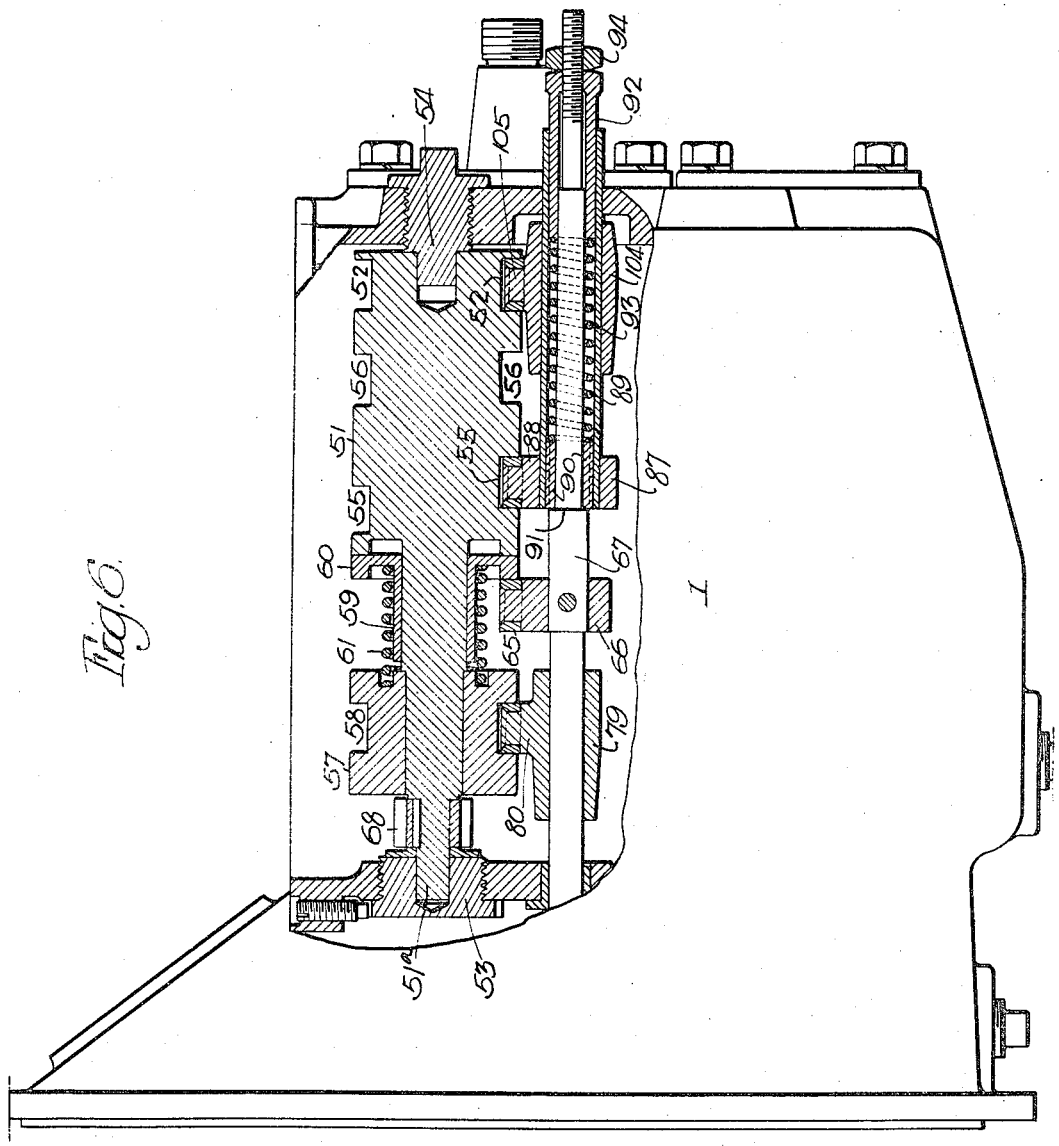
Fig. 6 is a side view partly broken away on the line 6—6, Fig. 2, showing the cams in section.

Referring to Figs. 2, 3, 6 and 7, 51 is a cam shaft made as clearly shown in Fig. 6, having a forward end 51ª which is mounted in a bearing 53 in a casing, and in the opposite end is an opening into which extends a pin 54 screwed into the casing. Cut into the body of the shaft are cam grooves 52, 55 and 56, and secured to the reduced portion of the shaft is a cam 57 having a groove 58. It will be noticed in Fig. 6 that the cam 57 is spaced from the large portion of the cam 51, and mounted on the cam shaft is a sleeve 59 having a flange 60 of the same diameter as the large diameter of the cam 51, and between this flange and the cam 57 is a coil spring 61 which tends to hold the flange yieldingly against the end of the cam 51.

Figure 10:
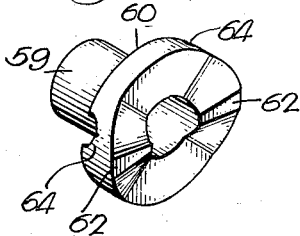
Fig. 10 is a detached perspective view of the spring pressed collar on the cam shaft.
Figure 12:
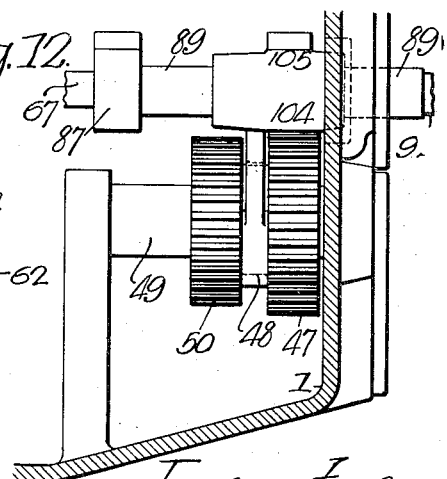
Fig. 12 is a detached view showing the reverse gears and the shifts therefor.

This flange 60 has projections 62, as shown in Fig. 10, which rest in recesses 63 in the end of the enlarged portion of the cam shaft 51, and the recesses, as well as the projections, are bevelled so that one can slide upon the other when the spring 61 yields. In the opposite face of the flange 60 are notches 64 into which a roller 65 can enter to frictionally hold the disk in position. This roller is carried by an arm on a shifting collar 66 secured to the spindle 67, Fig. 6, adapted to bearings in the casing.

On the reduced end of the cam shaft 51 is a pinion 68 which meshes with a rack 69 held against the pinion by rollers 70. On this rack is a pin 71 which is engaged by one arm of a lever 72 pivoted on a stud 74 mounted in the frame. The short arm of this lever 72 is connected by a link 75 to an arm 76 of an operating lever 77 secured to a shaft 78 mounted in bearings in the casing 1, Figs. 1 and 5, so that when the lever 77 is moved on its pivot 78, the rack 69 is raised or lowered, turning the cam shaft the required distance. The spindle 67 carries the several shifters which are actuated by the cams.

Figure 3:
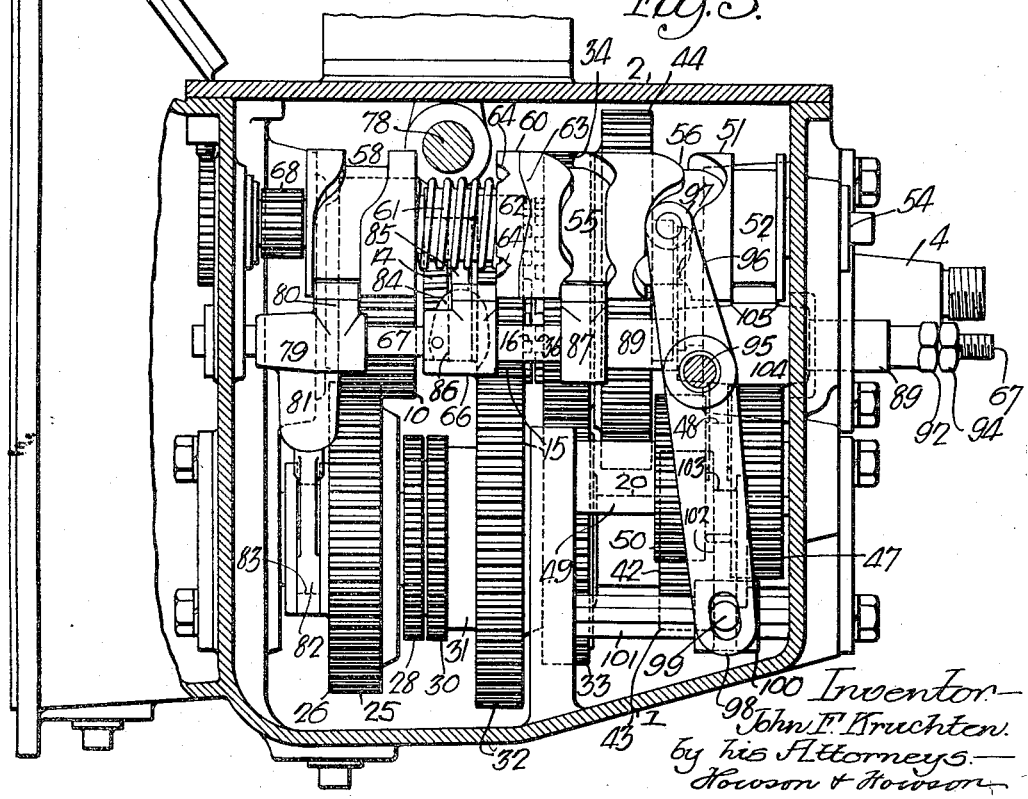
Fig. 3 is a longitudinal sectional view on the line 3—3, Fig. 2.
Figure 4:
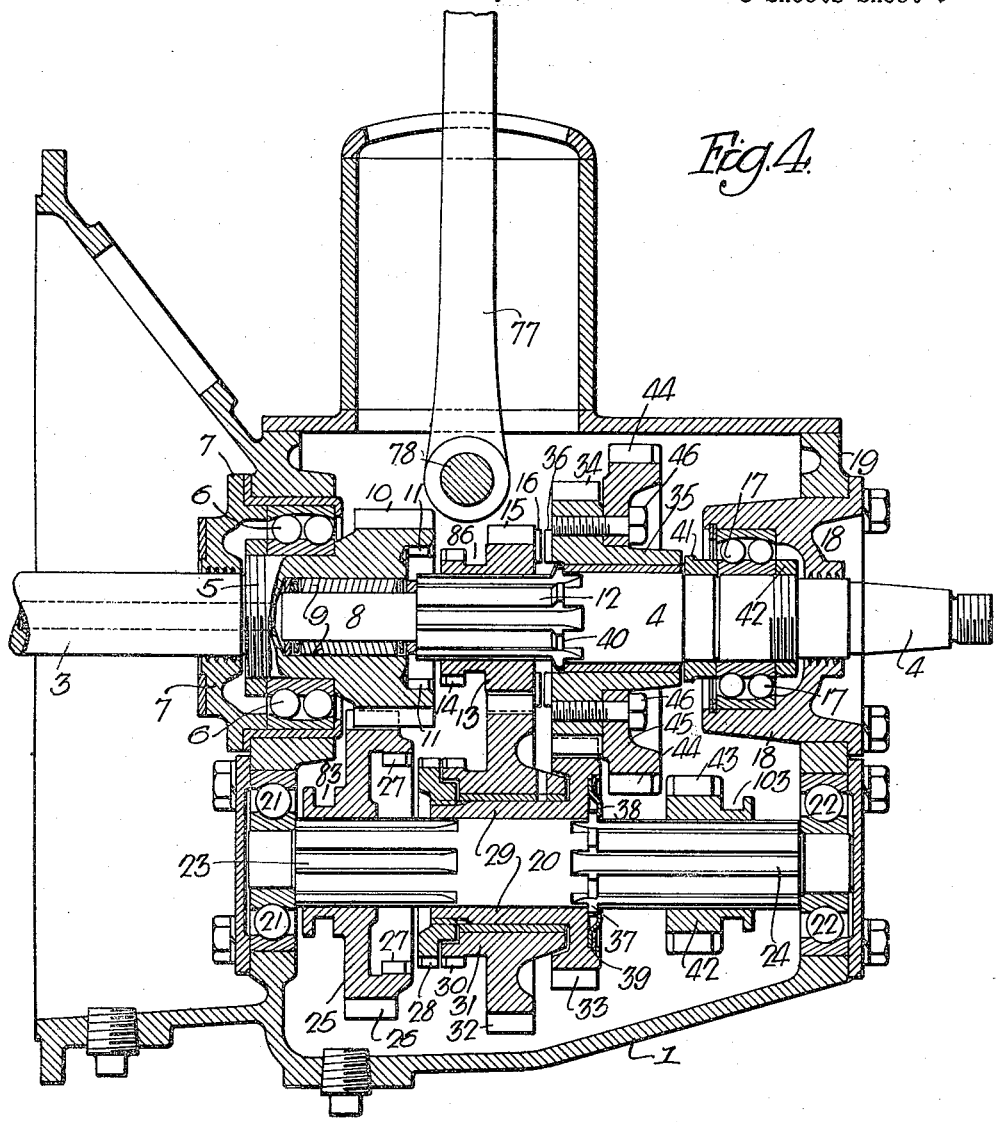
Fig. 4 is a longitudinal sectional view on the line 4—4, Fig. 2.

Referring to Figs. 3 and 6, 79 is a shifter which can slide on the spindle 67 and has an arm 80 and a roller which extends into cam groove 58 of the cam 57. This shifter has an arm 81 which has a forked end 82 extending into the groove 83 in the hub of the gear wheel 25. This cam is so stepped that it will move the gear wheel 25 either into engagement with the hub 29 or wheel 31, the cam groove being clearly shown in Fig. 7.

Projecting from the hub 66 is an arm 84, Fig. 5, which has a forked extension 85 extending into the groove 86 of the gear hub 13, and this mechanism moves the gear hub 13 either into engagement with the hub 5 of the driving shaft or brings the teeth 16 into mesh with the teeth 36 on the gear wheel 35.

The notches 64 in the flange 60 allow the collar 66 to move longitudinally toward the rear a sufficient distance for the teeth 16 to engage the teeth 36.

87 is a collar having an arm 88 provided with a roller extending into the groove 55. This collar is fixed to an elongated tube 89, Fig. 6, which has fixed within one end a bushing 90 through which extends the spindle 67. The spindle is splined to said bushing and has a shoulder 91 against which the bushing rests so that the spindle can move longitudinally in the tube.

Located between the bushing 90 in the tube and an elongated nut 92 on the spindle is a coiled spring 93 and back of the nut is a jam nut 94. The nut 92 can be adjusted longitudinally on the spindle to increase or diminish the tension of the spring. The tube 89 is free to move on the spindle and through its bearing in the casing, its movement being controlled by the cam 55.

In order to move the roller 65 out of one of the deep notches 64 in the flange 60, the cam 55 moves the collar 87 forward against the shoulder 91, moving the rod 67 and the collar 66 which carries the roller 65. This action also relieves the tension on the spring 93 and withdraws the clutch teeth 16 from the teeth 36. To make the above operation possible a certain amount of movement is required between the flange 60 and the cam 51 so that the said cam can be turned. This is accomplished by the projections 62 riding up the inclined faces of the recesses 63, while the flange 60 is held from rotating due to the roller 65 resting in the notches 64. The cam 55 moves the roller 65 a distance equal to the height of the projections 62 and the depth of the notches 64 combined, releasing the roller 65 from the notches 64, at which time the spring 61 returns the flange 60 to its normal position. When the cam 55 moves the collar 87, the tube 89, and bushing 90 rearwardly, tension is again applied to the spring 93 forcing the roller 65 against the plain face of the flange 60 so that when the roller 65 comes abreast of another of the notches 64, the clutch teeth 16 are resiliently pressed against the teeth 36 so that they may mesh without shock or grinding.

Pivoted on a stud 95 is a lever having an arm 96 provided with a roller 97 extending into the cam groove 56 and an arm 98 which is slotted at its lower end to engage a pin 99 on a shifter 100 splined to an elongated fixed stud 101, so that while it can slide on the stud it cannot turn thereon. This shifter has an arm 102 which extends into the groove 103 in the gear wheel 42 which is mounted on the shaft 20. When the shifter is actuated by its cam 56, the gear wheel 42 is moved into or out of mesh with the gear wheel 45.

The cam groove 52 controls the movement of the reverse mechanism.

On a shifter 104 is an arm 105 having a roller which extends into the cam groove 52, and has an arm 106 which extends into the groove of the hub 48 carrying the intermediate gear wheels 47 and 50. The groove 52 is offset at one end only (Fig. 7) so that when the roller enters this offset the gears 47 and 50 are shifted into engagement with the gears 42 and 45 reversing the movement of the driven shaft.

Figure 2:
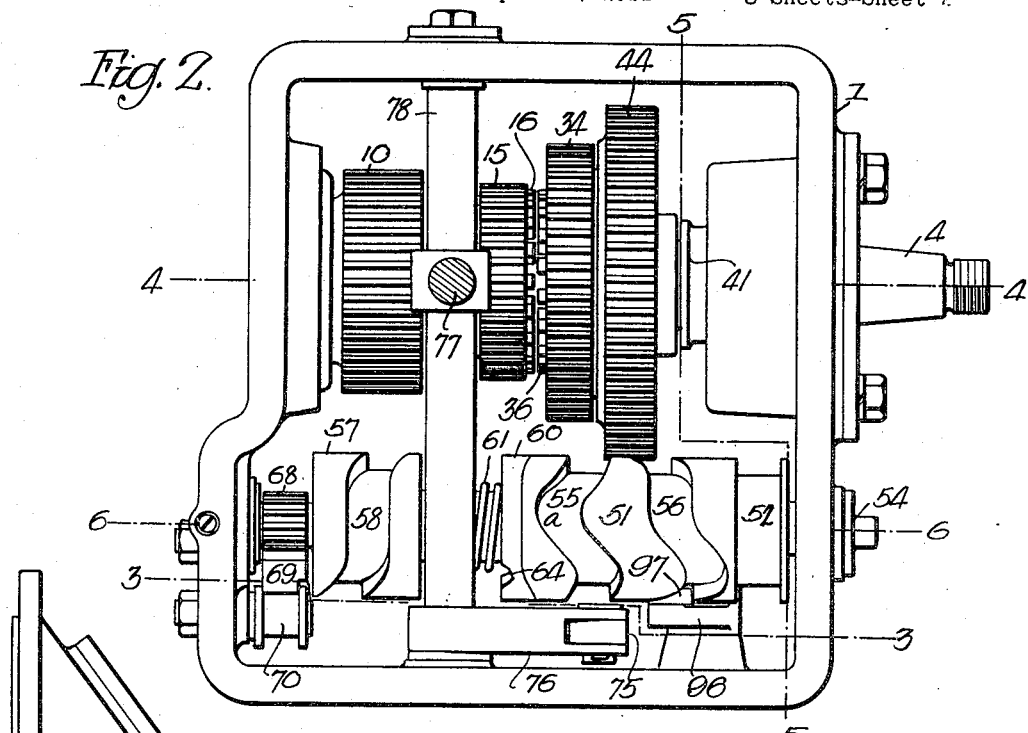
Fig. 2 is a plan view with the top plate removed.
Figure 7:
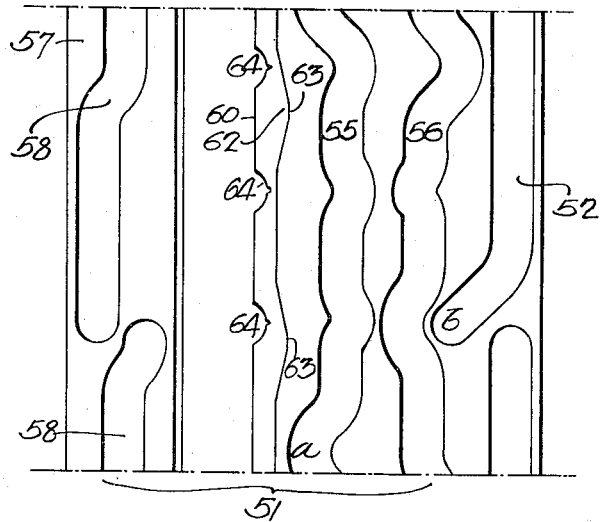
Fig. 7 is a development of the cams.

The cam 55 which controls the movement of the shifter collar 87 and tube 89 is so cut that when the roller is in the extreme position to the left $a$, Figs. 2 and 7, the collar 87 strikes against the shoulder 91 moving the rod 67 and the shifter collar 66, causing the gear hub 13 to engage the hub 5 of the engine shaft. The drive is then direct from the engine driving shaft 3 to the driven shaft 4. When in this position the gear 25 is still in mesh with the teeth of the hub and the teeth 15 of the gear hub are in mesh with the teeth 32 of the wheel 31, but these two gears 25 and 31 turn freely without imparting motion.

When it is desired to increase the speed beyond the normal direct drive, then the lever is moved so as to throw the teeth 27 of the gear wheel 25 in mesh with the teeth 30 of the gear wheel 31. This gear wheel then drives the gear hub which is splined to the driven shaft and the speed will be increased according to the diameter of the wheels.

When it is desired to place the mechanism in second, or intermediate, gear, the wheel 25 is moved to engage only the teeth 28 of the hub 29 and this hub will drive through the teeth 33 and the wheel 34 and at the same time the gear hub 13 is moved to the right so that its clutch teeth 16 will engage the teeth 36 on the gear wheel 35 and the shaft 4 will be driven through the above described gear at a reduced speed from the direct drive.

If it be desired to throw the gears into first or low position, then the gear wheel 25 is withdrawn from engagement with either of the teeth 28 or 30 and the gear 42 is actuated by the cam 56 through the lever having arms 96 and 98, so that the teeth 43 will mesh with the teeth 44 of the gear wheel 45, and the gear hub will be moved to the right so that its clutch teeth 16 will mesh with the clutch teeth 36 on the wheel 35 to which the wheel 45 is secured, and the wheel 45 being much greater in diameter than the wheel 42, the speed will be slow, which is the first or low speed.

When it is desired to reverse the direction or movement of the driven shaft 4, then the cam shaft is moved to its extreme position so that the roller on the arm 105 of the shifter 104 will move into the abrupt portion $b$ of the cam slot 52 and the shifter will move the gears 47 and 50 longitudinally on their shaft 49 so that the gear wheel 47 will mesh with the wheel 42 and the wheel 50 will mesh with the wheel 45 reversing the movement of the driven shaft 4.

Figure 8:
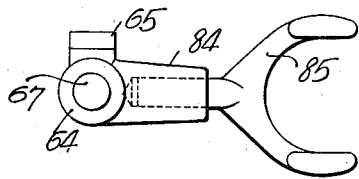
Figs. 8 and 9 are detached views of one of the shifting yokes.
Figure 9:
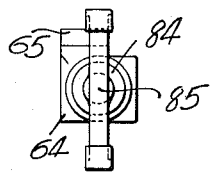
Figure 11:
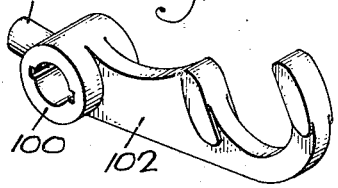
Fig. 11 is a perspective view of the shifter for the low speed gear.

It will be noticed, in referring to Figs. 8 and 9, that each shifter arm is provided with a forked extension which is pivotally mounted in the arm so that it will accommodate itself to the grooves in the several wheels.

In Fig. 13 a modification of the invention is illustrated in which the hub $5^a$ is geared to a wheel $25^a$ secured to a shaft $20^a$. This shaft is splined and the two wheels $31^a$ and $42^a$ can be moved longitudinally on the splined portion of the shaft. The wheel 31ª will mesh with the teeth 34ª, and the wheel 42ª will mesh with the teeth 44ª. Both gear teeth 34ª and 44ª are on the gear hub 35ª which can be clutched to the gear hub 13ª in the manner hereinbefore described. The gear hub 13ª has internal teeth 14ª which are arranged to mesh with external clutch teeth on the hub 5ª.

In Fig. 14 another modification is shown in which the driving hub 5ᵇ is geared to a wheel 25ᵇ secured to a shaft 20ᵇ. Loosely mounted on this shaft is a gear 31ᵇ controlled by a cam. Each of these gears 31ᵇ and 25ᵇ has clutch teeth so that the gear 31ᵇ can be driven from the gear 25ᵇ. The teeth of this gear 31ᵇ mesh with the teeth 15ᵇ on the gear hub 13ᵇ, which is splined to the driven shaft 4ᵇ. This gear hub has clutch teeth which may engage with teeth on a wheel 42ᵇ splined to the shaft 20ᵇ. Both of these constructions can be used with the levers if desired.

The mechanism for turning the cam shaft is located in the main casing 1, and the operating lever 77 has its bearings in the casing. This construction makes the change speed gear self contained so that it can be readily placed in position in an automobile, the operating lever being in the same position as the ordinary change speed arm.

I claim:

1. The combination in a power transmission, of a driving shaft; a driving hub thereon, said hub having gear teeth on its periphery and also having coupling teeth at one end; a driven shaft in line with the driving shaft; a gear hub splined to the driven shaft, said hub having coupling teeth at one side arranged to engage the coupling teeth on the driving hub, and also having gear teeth on its periphery; coupling teeth on the opposite side; a gear wheel loosely mounted on the drive shaft and having two sets of gear teeth on its periphery and having coupling teeth at one side arranged to engage the clutch teeth on the gear hub when said hub is moved in one direction; an intermediate shaft; a gear wheel on said shaft meshing with the teeth on the driving hub; a wheel on the shaft meshing with one set of teeth on the gear wheel loosely mounted on the drive shaft; another gear slidably mounted on the intermediate shaft and arranged to mesh with the other set of teeth on the gear wheel loose on the driven shaft; and means for actuating the several parts so that the driven shaft can be driven at different speeds.

2. The combination in a power transmission of a driving shaft; a hub mounted thereon having teeth on its periphery and also having coupling teeth; a driven shaft in line with the driving shaft; a gear hub splined to the driven shaft and having teeth arranged to engage the coupling teeth on the driving hub and also having teeth on its periphery and clutch teeth at one end; a gear wheel loosely mounted on the driven shaft also having clutch teeth arranged to be engaged by the clutch teeth of the gear hub; an intermediate shaft; a gear wheel on said shaft arranged to mesh with the teeth on the driving hub, said gear wheel being splined to the intermediate shaft and having coupling teeth; a gear hub having teeth arranged to engage the coupling teeth of the last mentioned gear wheel; a gear wheel mounted on the gear hub and also having teeth at one end arranged to engage the coupling teeth of the aforesaid gear wheel, one of said wheels being greater in diameter than the other, the last mentioned gear wheel meshing with the teeth on the gear hub and the other gear wheel meshing with the teeth of the wheel which is loosely mounted on the driven shaft; a second gear wheel secured to, or forming part of, the last mentioned gear wheel; a gear wheel splined to the intermediate shaft and arranged to mesh with the teeth of the said second gear wheel; a cam for actuating the several gears; and means for turning the cam.

3. The combination in a power transmission, of a driving shaft; a driven shaft; an intermediate gear between the two shafts whereby the speed of the driven shaft may be varied; a cam shaft having three cam grooves cut therein, one of said grooves controlling the lever mechanism, the other controlling the low speed gearing; a cam secured to said cam shaft and controlling the gearing by which the speed is increased above normal, or decreased below normal; a shifter spindle; a shifting collar secured to said spindle; a tube having an arm thereon extending into the cam groove in the cam shaft; a spring, located between the shoulder on the sleeve and the shoulder on the spindle, tending to move the shifting collar against the end of the cam; a yielding cam flange against which the shifting collar rests; and a spring bearing against said flange, said flange being notched to allow the shifting collar to move to throw the clutch into mesh so that the drive will be through certain gears, the shifting collar being free to move in the opposite direction against the pressure of the spring on the spindle and to move the parts into direct normal connection.

4. The combination in a power transmission, of a driving shaft having a hub thereon; a driven shaft; a gear hub splined to said driven shaft; a gear wheel loose on the driven shaft, said gear hub arranged to engage either the driving hub or the gear wheel; an intermediate shaft; gears thereon arranged to mesh with the driving hub and the gear wheel; reverse gearing; a shaft on which said gearing is mounted; a cam for shifting the several gears; a spindle; and shifting arms on the spindle controlled by the cam and engaging the movable gears.

5. The combination in a power transmission, of a casing; a driving shaft extending into the casing and having a hub; a driven shaft also extending into the casing; a gear wheel loosely mounted on the driven shaft; a sliding gear hub splined to the driven shaft and arranged to engage either the driving hub or the loose gear wheel; an intermediate shaft; gears thereon; a cam shaft; shifters controlled by the cam shaft; a pinion on the cam; a rack engaging the pinion; a lever engaging the rack; and an operating lever having one arm connected to the rack lever and the other arm extending through the casing.

JOHN F. KRUCHTEN.